Oct. 26, 1954  H. PEARCE ET AL  2,692,935
SOLDERING TOOL
Filed Jan. 24, 1951  2 Sheets-Sheet 1
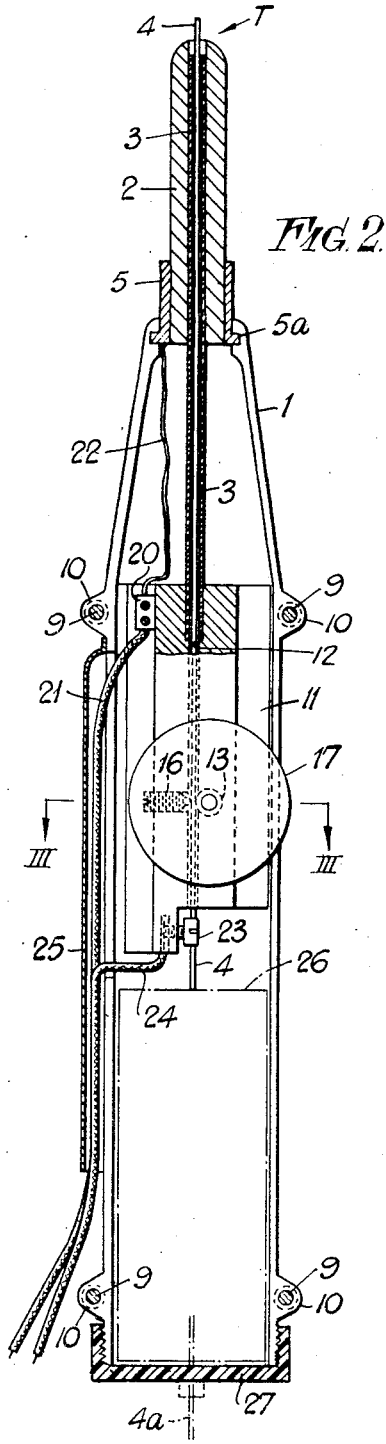
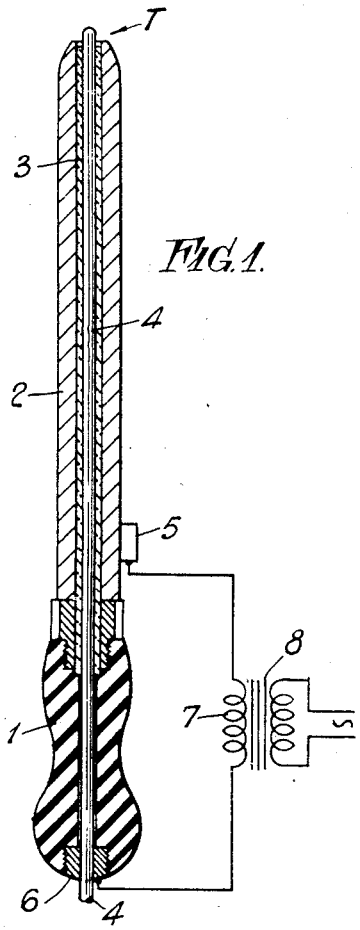
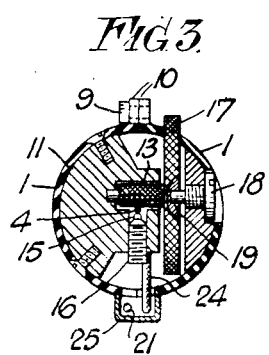
INVENTORS
Herbert Pearce
Robert William Homewood
BY
Bennett, Edmonds, Morton, Barrows and Taylor
ATTORNEYS

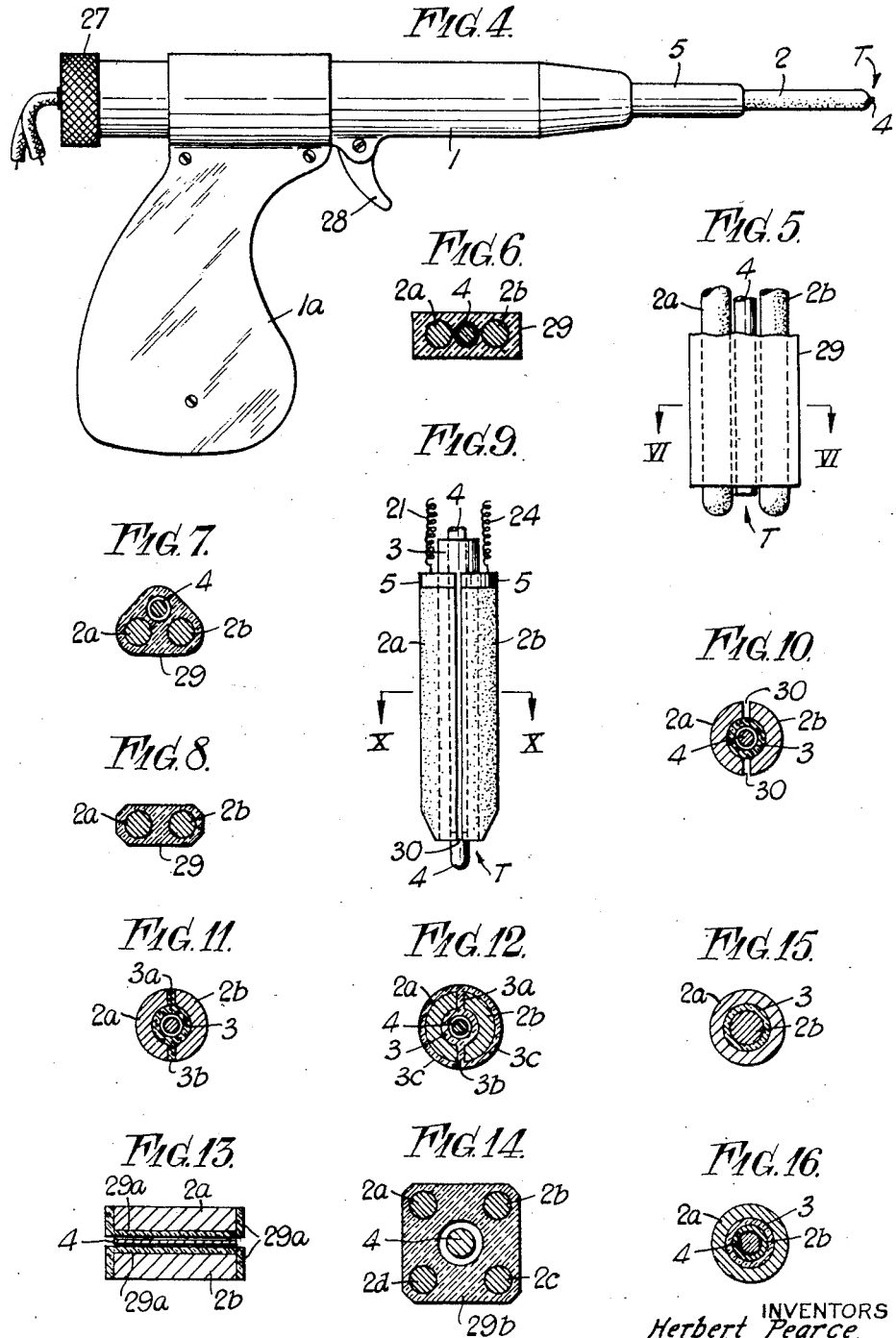

Patented Oct. 26, 1954

2,692,935

UNITED STATES PATENT OFFICE 2,692,935

SOLDERING TOOL

Herbert Pearce and Robert William Homewood, London, England, assignors to Budd & Weston (Special Machines) Limited, London, England, a British company Application January 24, 1951, Serial No. 207,452

Claims priority, application Great Britain June 26, 1950

4 Claims. (Cl. 219—27)

This invention concerns soldering tools and has for an object to provide a tool which is particularly, although not exclusively, suitable for soldering parts having a relatively heavy mass or large surface area.

Another object of the invention is to provide a soldering tool of improved construction which is economical in use.

A further object of the invention is to provide a soldering tool which can be operated on a low voltage D. C. supply such as an accumulator or a dry battery of suitable capacity.

A still further object of the invention is to provide a soldering tool which is compact, robust and relatively cheap to manufacture.

Various alternative embodiments of the invention will now be described by way of illustration only, reference being directed to the accompanying drawings in which:

Fig. 1 is a generally schematic longitudinal cross-section of a first embodiment;

Fig. 2 is a longitudinal cross-section of a second embodiment, the solder feed mechanism being shown in elevation;

Fig. 3 is a transverse cross-section on the line III—III of Fig. 2;

Fig. 4 is a side elevation of a third embodiment;

Fig. 5 is a fragmentary elevation of the working end of a fourth embodiment having two electrodes in addition to a solder core;

Fig. 6 is a sectional view on the line VI—VI of Fig. 5;

Fig. 7 is a sectional view similar to Fig. 6 showing a slightly modified arrangement of the electrodes and solder core;

Fig. 8 is a sectional view similar to Fig. 6 showing a still further modification in which the solder core is omitted;

Fig. 9 is a fragmentary view similar to Fig. 5 of a fifth embodiment;

Fig. 10 is a sectional view on the line X—X of Fig. 9;

Figs. 11 and 12 are views similar to Fig. 10 showing two modifications, and

Figs. 13–16 are similar transverse cross-sections through the electrodes of still further embodiments of the invention.

Throughout the drawings, like parts carry similar references.

In the first embodiment illustrated in Fig. 1 of the drawings, the soldering tool comprises an insulating handle 1 carrying at one end a tubular outer electrode 2 composed of hard carbon. Within the bore of this electrode is located an insulating sleeve 3 of ceramic or other suitable rigid and heat resisting material. Within this sleeve 3 is mounted a core of solder 4 which passes through the handle 1. The tubular carbon electrode 2 is provided adjacent the handle 1 with a terminal connection 5 (shown schematically in the drawing) whilst the core of solder 4 is arranged to make electrical contact with another terminal 6 (mounted in the handle). Both terminals 5 and 6 are arranged to be connected to the ends of the secondary winding 7 of a mains transformer 8, the secondary voltage being conveniently of the order of 6 volts and capable of supplying a load current of the order of 1½ to 4 amps.

The electrical connection to the solder 4 may be made in any other convenient manner such as, for example, a metallic ring located within the insulating sleeve 3 adjacent the working tip T of the tool and connected by a suitable conductor to a terminal (such as that shown at 6) on or adjacent the handle 1 of the tool. Alternatively, the insulating sleeve 3 may have a thin conducting layer round its internal surface throughout the whole of its length, this layer being connected at its inner or handle end to a terminal connection. It is thought that these and similar modifications of the arrangement for making electrical connection to the solder core 4 will be clear to those skilled in the art without further description or illustration.

The solder core 4 may be an easy sliding fit in the bore of the insulating tube 3 so that, as solder is consumed at the working tip T of the tool, the core can slide downwards under gravity to maintain the necessary feed of solder to the work. Alternatively, a positive feed mechanism may be provided, such as that described below with reference to Figs. 2 and 3 of the drawings.

In use, the tool is presented to the surface or surfaces to be soldered and current is switched on to the mains transformer 8. The working tip T of the tool is then brought into contact with the work so that both the solder 4 and the tubular electrode 2 make contact therewith. The tool may then be drawn away from the work slightly so that an arc is struck between the solder 4 and the tubular electrode 2. The heat of the arc causes melting of the solder which then flows on to the surface to be soldered, the process continuing until the current is switched off. Alternatively, the solder 4 and the electrode 2 may be maintained in contact with the surface of the work so that the current flowing therethrough causes local heating of the work to a temperature above the melting point of the solder 4. In either case, it has been found that soldered joints can be made of equal strength and durability to those made by the usual process in which a heated bit is tinned and rubbed over or brought into contact with the parts or surfaces to be soldered. Moreover, there is no initial delay such as is encountered in such tools whilst the soldering bit is heated to the requisite temperature.

Referring now to Figs. 2 and 3 of the drawings, the handle 1 is shown as a hollow insulating casing which is split longitudinally into two substantially similar halves which are secured together in any convenient manner—as, for example, by screws or bolts 9 through lugs 10 on the edges of the two parts. The tubular carbon electrode 2 is mounted in the nose of the casing 1 by means of a metal bush 5 which constitutes the terminal connection to the electrode. This bush may be provided with a slightly tapered bore whereby the electrode 2 may be wedged in position, or it may be of a resilient metal and split longitudinally in the fashion of a collet to grip the electrode. The bush 5 is flanged at 5a, the flange being located in a corresponding groove in the two parts of the handle or casing 1.

Within the hollow casing 1 is mounted a metal block 11 having a through bore 12 located coaxially with the bore through the tubular electrode 2, it being preferred to enlarge the forward end of this bore 12 to accommodate, and constitute an anchorage for, the adjacent end of the insulating sleeve 3 which passes through the electrode 2. In the block 11 is journalled a short transverse sleeve 13 having its external surface knurled or ribbed, and located so as to project through a wall of the bore 12 to engage the solder core 4. The latter is held in contact with the sleeve 13 by means of a ball 15 (Fig. 3) mounted in a part-spherical socket formed in the inner end of a grub screw 16 threaded into the block 11. This screw 16 can be adjusted to suit differing diameters of solder core 4.

To the sleeve 13 is secured a thumb wheel 17 having a knurled periphery which projects sufficiently through the casing 1 to be easily engageable for rotation by the thumb of the hand holding the tool. A short spigot-ended screw 18 is mounted in one of the casing parts coaxially with the thumb wheel and on the opposite side thereof from the knurled sleeve 13 so that the spigot end 19 projects into a recess in the face of the thumb wheel 17 and forms a bearing therefor, as shown in Fig. 3. It will be understood that the assembly of knurled sleeve 13 and thumb wheel 17 constitutes a manual feed mechanism for advancing or retracting the solder core 4 through the tubular electrode 2.

The forward end of the block 11 carries an insulated terminal block 20 for connecting one lead 21 of the external power supply to a conductor 22 for conveying current to the terminal bush 5 and thence to the electrode 2. The other end of the block 11 is provided with a clamping screw 23 for anchoring the end of the other lead 24 from the external power supply (which may be the secondary winding 7 of the transformer 8 shown in Fig. 1), the two leads 21, 24 being conveniently accommodated in a guide channel or tube 25 attached to one of the casing parts. It will thus be seen that the block 11 and the feed mechanism 13, 15 constitute the equivalent of the terminal connection 6 in the embodiment shown in Fig. 1 for connecting one pole of the supply to the solder core 4.

The rear end of the hollow casing 1 provides a magazine for a coil or spool of solder indicated in chain lines 26. In some cases, however, the tool may be always used at a certain location such as a bench in a workshop, and in such a case the solder may be wound on a reel supported in a fixed bracket and drawn through a hole in an end cover 27 of the casing 1, as indicated by the chain lines 4a. In either arrangement, the tool is used in the same way as that shown in Fig. 1.

Since the tool consumes electrical energy only during the actual periods of soldering, which are normally of only a few seconds' duration, and the current taken during such periods frequently does not exceed, say, 2 to 3 amperes, it is often possible to operate the tool from a dry battery. The space at the rear end of the casing 1 may, therefore, if desired be proportioned to accommodate such a battery, suitable provision for making the necessary connections being made in any of the known ways, as will be understood.

Fig. 4 illustrates a further embodiment of the invention in which the handle 1 is provided with a pistol grip 1a which may also serve to accommodate a coil of solder. The figure also indicates a trigger 28 which may replace the thumb wheel 17 for feeding solder through the electrode 2 by means of a convenient form of stepwise feed mechanism (not shown).

Fig. 5 is a fragmentary plan view of an alternative electrode arrangement. In this embodiment of the invention, two solid carbon electrodes 2a, 2b are located side by side on parallel axes, and are held in an insulating block 29 of ceramic or other heat-resisting material. The inner end of this block 29 is clamped in the front end of the casing 1, suitable provision being made at this end for connecting both electrodes 2a, 2b to one pole of the supply. The electrodes are spaced apart sufficiently to allow a solder core 4 to be located therebetween with insulating clearance. Fig. 6 shows how the electrodes 2a, 2b, and the solder core 4 may be arranged with their axes coplanar, whilst Fig. 7 shows an arrangement in which the axis of the solder core 4 is offset from the plane containing the axes of the electrodes.

A tool constructed in this way may have its electrodes 2a, 2b connected to the two poles of the supply, no connection being made to the solder core 4. In such an arrangement, the working ends of the electrodes are brought into contact with the work so that a heating current flows through the surface of the work between the electrode tips. As soon as the work has reached a temperature above the melting point of the solder, the core 4 is fed thereonto and fuses on the work. In this way, a surface can be tinned in readiness for a sweating operation. After tinning of the surface has been completed, the two parts to be sweated can be brought into contact and the necessary heat for sweating produced by maintaining the electrodes alone in contact with the work.

Fig. 8 shows a modification of the arrangement of Figs. 5–7 in which the tool is provided only with two carbon electrodes 2a, 2b which are held, with their axes parallel, in an insulating block 29. The tool is used to heat the surface of the work to the required temperature, the solder being separately applied thereto. This arrangement of tool is particularly suitable for the tinning of relatively large surfaces and for the sweating together of parts having a relatively high mass or surface area, and from which heat is conducted rapidly by radiation or conduction. Owing to the very local nature of the heating effect, the whole mass does not have to be raised to approximately the fusing temperature of the solder before fusion thereof can be effected over the desired zone. A considerable saving of energy is thus achieved as compared with the more usual kind of soldering iron.

Fig. 9 is a fragmentary plan view of a still further embodiment in which the electrodes 2a, 2b are in the form of half tubes. The electrodes are assembled on a central insulating and heat-resisting sleeve 3 through the central bore of which passes the solder core 4, the opposed longitudinal edges of the electrodes being separated by air gaps indicated at 30 (see also Fig. 10). The inner ends of the electrodes 2a, 2b have conducting layers 5 deposited or otherwise mounted thereon in electrically conducting manner to constitute terminal connections for the leads 21, 24 from the supply. The whole assembly is suitably clamped in an insulating bush in the front end of the handle or casing 1, as will be understood without further illustration.

In the arrangement illustrated in Fig. 11, the central sleeve 3 is provided with longitudinal ribs 3a, 3b which serve to positively space the adjacent edges of the electrodes by projecting into the gaps 30 shown in Figs. 9 and 10. In the modification shown in Fig. 12, the sleeve 3 is formed integrally with an outer tubular portion 3c which encircles the electrodes 2a, 2b and serves as both a mechanical and electrical protection therefor throughout the greater part of their projecting lengths. Such an arrangement has the added advantage of permitting the tool to be inserted into relatively narrow spaces between metal parts without risk of short-circuiting the electrodes before they reach the part to be soldered.

Fig. 13 shows a further embodiment of the invention in which the electrodes 2a, 2b are of rectangular cross-section and have their inward facing sides and their side edges encased in insulating material 29a. A space is left between the electrodes such that a thin ribbon of solder 4 may be fed therebetween. Alternatively, a plurality of strips or wires of solder may be passed side-by-side between the electrodes. This construction also is particularly suitable for tinning or sweating work having relatively large surface areas.

Fig. 14 shows an arrangement in which four electrodes 2a . . . 2d are mounted in a common insulating carrier 29b having a symmetrically disposed through bore 12 adapted to accommodate a solder core 4. The electrodes 2a . . . 2d may be connected to a common pole of the supply whilst the solder core 4 is connected to the other pole; or the electrodes may be connected in pairs to the poles of the supply, the solder core 4 being insulated therefrom. Or again, the electrodes 2a . . . 2d may be connected one each to a respective pole and one to the neutral of a three-phase A. C. supply.

In the form of tool illustrated in Fig. 15, the electrodes 2a, 2b are arranged concentrically and insulated from each other by a tubular sleeve 3. This form of tool is used in similar manner to that shown in Fig. 8, the solder being presented independently to the work. In the form shown in Fig. 16, however, both electrodes 2a, 2b are of tubular form, arranged concentrically, a core of solder 4 being fed through the inner tube 2b. In an alternative arrangement, the positions of the central solder core 4 and the inner electrode 2b are interchanged, the latter being a solid rod and the solder being fed through the annular space between the said rod and the bore of the sleeve 3. The solder in this arrangement may be in the form of a ribbon bent to cylindrical shape, or of a number of separate narrow strips or wires.

Although in the foregoing description, the non-fusible electrode 2 electrodes 2a, 2b . . . have been described as of carbon, it is to be understood that any other conducting material which is not fusible at the operating temperature employed may be used if preferred. Alternatively, the non-fusible electrodes may be of metal and provided with carbon or sintered metal tips at the working tip T of the tool. In a still further modification, the greater part of the non-fusible electrode may be of insulating material and only the tip of a conducting material.

The use of carbon as non-fusible electrode or electrode tip material is preferred on the grounds of non-oxidation under arcing conditions and relative cheapness. A metal-sheathed carbon rod may be used as an electrode if desired to facilitate connection to the supply and to provide mechanical protection. Various other arrangements of electrode 2 will doubtless present themselves to those skilled in the art.

A tool according to the invention may be provided with a retractable or extensible electrode or electrodes 2, 2a, 2b . . . if desired in order that the tool may be adjusted to work in a cramped or relatively inaccessible place. Alternatively, the electrode or electrodes 2, 2a, 2b . . . may be readily detachable for the substitution of others of different lengths. It is thought that the details of attachment of an electrode to the handle 1 for any of the above modified arrangements will be understood by those skilled in the art, and represent purely mechanical devices within the scope of the invention.

A soldering iron according to the present invention may be made of substantially similar dimensions to those of an ordinary propelling pencil, thus rendering the tool particularly suitable for small work such as the manufacture of jewelry. Furthermore, the voltage applied to the working parts of the iron can be made comparatively low so that the thickness of the insulating sleeve can be reduced to a minimum. In addition, the risk of shock due to development of a fault in the insulation is eliminated. Since the heat for melting the solder is generated by the arc or in the surface layer of the work through which current flows between the electrodes, and is very localised, the losses due to conduction and radiation are kept very low so that the efficiency of the tool is high.

The supply transformer 8 (Fig. 1) will normally be accommodated externally of the tool, which is then connected to the secondary winding 7 thereof through a flexible lead. It may, however, be found advantageous to mount the transformer 8 within the handle 1 itself. The handle 1 may also be provided with a universal adaptor for accommodating various sizes of electrodes 2, 2a . . . and solder core 4 if desired.

It has been found possible to solder with a tool according to invention in any attitude, including that in which the electrodes are pointed upwards to the underside of the work. In order, however, to enable the tool to be rested on a metal surface without risk of short-circuiting of the electrodes, it may be desirable to incorporate into the handle a gravity switch, such as a mercury switch, for disconnecting the electrodes from the supply. Such a gravity switch may be bypassed by a manually operable switch which is normally biased to the open position.

A further advantage of the tool is that the electrodes themselves are not required to be brought to the soldering temperature, and normally remain cold during a soldering operation. The energy consumption of the tool is thus limited to that required for the satisfactory melting of the quantity of solder required on the work. The tool may be left energised during periods when it is not actually in use, but no consumption of power takes place until the electrodes are actually brought into contact with the work. The tool thus has a very high efficiency compared with the more usual types of soldering tools employing heated bits, the temperature of which is frequently maintained at the working value for long idle periods.

It has been found in practice that a wide range of low-melting point alloys may be used with the tool as the fusible electrode or solder, and this leads to a still further economy by permitting the reduction, or even elimination, of tin from the alloy. It is even envisaged that alloys not in the lead-tin group may be used as solder in particular applications. In this specification, therefore, the term "solder" is understood to include any relatively low melting point metal or alloy such as pure lead or a lead-tin alloy having a small tin content. Also, it is understood that the term "semi-annular" is generic in the sense that it includes not only half annular portions but also annular portions substantially smaller than half.

What we claim is:

1. An electric soldering tool comprising a tubular insulating guide having a passageway for the passage therethrough, with a sliding fit and in close proximity to a wall thereof, of an elongated element composed of solder, means for advancing such a solder element towards and through one end of said guide, at least one non-fusible electrode element secured to and disposed in contact with the exterior of said guide and having an operative work-engaging portion closely adjacent but projecting a short distance freely beyond said one end of said guide, and means for connecting a source of electric current across at least two of said elements.

2. An electric soldering tool comprising a tubular insulating guide having a passageway for the passage therethrough, with a sliding fit and in close proximity to a wall thereof, of an elongated element composed of solder, means for advancing such a solder element towards and through one end of said guide, a plurality of semi-annular non-fusible electrode elements disposed in contact with the exterior of said guide and secured thereon in electrically insulated relation to one another, said electrode elements having work-engaging portions projecting a short distance freely beyond said one end of said guide, and means for connecting a source of electric current across at least two of said elements.

3. An electric soldering tool as claimed in claim 2 in which the semi-annular electrode elements are maintained on said guide in spaced relation to one another.

4. An electric soldering tool comprising a housing, a tubular insulating guide having a passageway for the passage therethrough, with a sliding fit and in close proximity to a wall thereof, of an elongated element composed of solder, means within said housing for supporting said guide with one end thereof projecting from said housing, means within said housing for advancing such a solder element towards and through one end of said guide, a plurality of semi-annular non-fusible electrode elements, said housing having separable sections for replaceably supporting said electrode elements in contact with the exterior of said guide and with their work-engaging portions projecting freely beyond the exposed end of said guide, and means for connecting a source of electric current across at least two of said elements.

References Cited in the file of this patent

UNITED STATES PATENTS

| Number | Name | Date |
|---|---|---|
| 1,893,093 | Linville et al. | Jan. 3, 1933 |
| 2,210,352 | Albietz | Aug. 6, 1940 |
| 2,228,291 | Weston | Jan. 14, 1941 |
| 2,396,799 | McCully | Mar. 19, 1946 |
| 2,550,090 | Schnepp | Apr. 24, 1951 |

FOREIGN PATENTS

| Number | Country | Date |
|---|---|---|
| 161,970 | Switzerland | Aug. 1, 1933 |
| 208,590 | Switzerland | May 1, 1940 |
| 494,419 | Great Britain | Oct. 21, 1938 |